United States Patent [19]

Katahira et al.

[11] 4,432,213

[45] Feb. 21, 1984

[54] AIR-CONDITIONING SYSTEM OF MOTOR VEHICLE

[75] Inventors: Hiroaki Katahira; Shigeru Kobayashi, both of Yokohama, Japan

[73] Assignee: Nissan Motor Company, Limited, Yokohama, Japan

[21] Appl. No.: 349,462

[22] Filed: Feb. 17, 1982

[30] Foreign Application Priority Data

Feb. 28, 1981 [JP] Japan .................................. 56-28800

[51] Int. Cl.³ ............................................. B60H 3/04
[52] U.S. Cl. ...................................... 62/239; 62/244; 98/2.15
[58] Field of Search ................. 62/239, 244, 262, 263, 62/297, 448, 449; 98/2.14, 2.15

[56] References Cited

U.S. PATENT DOCUMENTS

| 2,268,502 | 12/1941 | Browne | 98/2.15 X |
| 2,320,596 | 6/1943 | Henney | 62/244 |
| 2,338,931 | 1/1944 | Gould et al. | 62/239 X |
| 2,774,227 | 12/1956 | Schjolin et al. | 62/244 X |
| 3,218,821 | 11/1965 | Spatt | 62/239 X |
| 3,777,648 | 12/1973 | McGowan et al. | 98/2.15 X |
| 3,996,762 | 12/1976 | Calme | 62/239 X |

Primary Examiner—Lloyd L. King
Attorney, Agent, or Firm—Lane, Aitken & Kananen

[57] ABSTRACT

An air-conditioning system for use in a motor vehicle having a vehicle body including a seat structure mounted on the floor panel and a side wall member such as a center pillar located on one side of the seat structure, the air-conditioning system comprising an air-conditioner assembly which is positioned on one side of the seat structure and adjacent one of the wheel housings and which includes at least one heat exchanger unit and a covering member having the heat exchanger unit covered between the covering member and the vehicle body, the covering member having a substantially horizontal upper panel portion located sidewise inwardly of the center pillar so as to serve not only to cover the heat exchanger unit but as an armrest for an occupant of the seat structure.

10 Claims, 5 Drawing Figures

AIR-CONDITIONING SYSTEM OF MOTOR VEHICLE

FIELD OF THE INVENTION

The present invention relates to an air-conditioning system for use in a motor vehicle, particularly of the type equipped with three or more rows of seats in a fore-and-aft direction of the vehicle.

SUMMARY OF THE INVENTION

In accordance with the present invention, there is provided an air-conditioning system for use in a motor vehicle having a vehicle body including a floor panel, a roof panel, side wall members and a seat structure mounted on the floor panel, one of the side wall members being located on one side of the seat structure, the air-conditioning system comprising an air-conditioner assembly which is positioned on one side of the seat structure and which includes at least one heat exchanger unit and a covering member having the heat exchanger unit covered between the covering member and the vehicle body, the covering member having a substantially horizontal upper panel portion located sidewise inwardly of the aforesaid one of the side wall members. The air-conditioning system as set forth above may further comprise a duct structure comprising a pair of tubular side segments and a tubular intermediate segment, each of the side segments extending vertically along the inner surface of each of the side wall members, the intermediate segment longitudinally extending between the side segments along the lower surface of the roof panel and having opposite longitudinal end portions respectively connected to the side segments, one of the side segments extending in part upwardly from the above mentioned covering member and communicating with the heat exchanger. In the air-conditioning system according to the present invention, the vehicle body further includes a pair of wheel housings aligned with each other in a lateral direction of the vehicle body, one of the wheel housings being located sidewise of the above mentioned seat structure. In this instance, the air-conditioner assembly may be positioned above said one of the wheel housings.

BRIEF DESCRIPTION OF THE DRAWINGS

Drawbacks of a prior-art air-conditioning system for use in a motor vehicle and detailed construction and arrangement of an air-conditioning system according to the present invention will be understood from the following description taken in conjunction with the accompanying drawings, in which.

DESCRIPTION OF THE PRIOR ART

Figure 1:
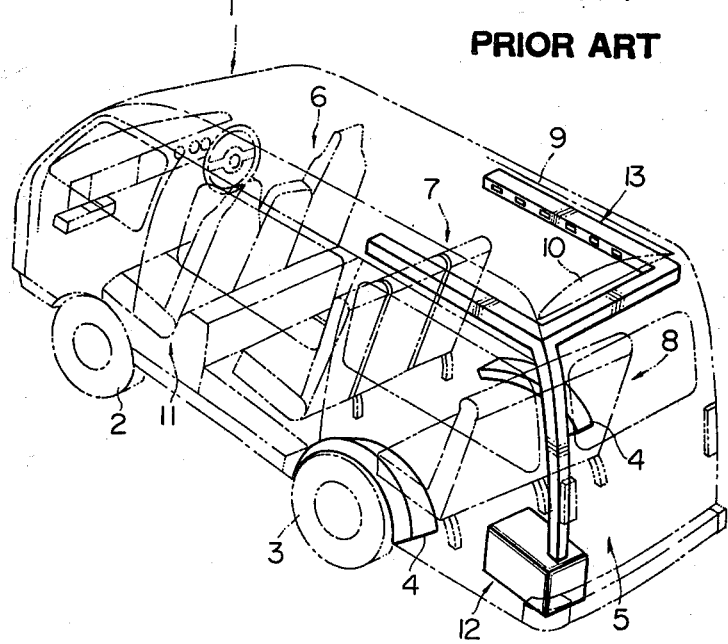
FIG. 1 is a perspective view schematically showing a station-wagon type motor vehicle equipped with a known air-conditioning system of the nature of the present invention.

Referring to FIG. 1 of the drawings, a motor vehicle equipped with a conventional air-conditioning system is shown as being of the station-wagon type having a vehicle body 1 and front and rear road wheels 2 and 3. The vehicle body 1 has rear wheel housings 4 respectively overlying the rear road wheels 3 and forms a luggage compartment 5 at the rear end thereof. The vehicle body 1 further has installed therein a plurality of rows of seats in a fore-and-aft direction of the vehicle. In the motor vehicle herein shown, the rows of seats are assumed to include three rows of seats, viz., a front row of seats 6, an intermediate row of seats 7 and a rear row of seats 8 as indicated by dot-and-dash lines. The luggage compartment 5 is located at the rear of the rear row of seats 8. The vehicle body 1 further has side roof rails 9 and a rear roof bow 10 as indicated by dot-and-dash lines.

In the motor vehicle of the type herein shown, the rear row of seats 8 is usually located between the rear wheel housings 4 as shown. The rear wheel housings 4 arcuately protrude upwardly into the interior of the vehicle body 1 and are located on both sides of the rear row of seats 8. Dead spaces are thus formed above the rear wheel housings 4 and are left unused.

On the other hand, the motor vehicle of the type having the three rows of seats 6, 7 and 8 usually has an engine compartment 11 below the front row of seats 6. By reason of the serious space requirement resulting from such a construction of the vehicle, the engine compartment 11 can not provide an ample space for the accommodation of a heavy-duty air-conditioning system required for air-conditioning the spacious interior of the vehicle. For this reason, the air-conditioning system installed on the motor vehicle of the type under consideration has a main or auxiliary air-conditioner unit 12 accommodated within the rear luggage compartment 5 at the rear of the rear row of seats 8. An air-conditioning duct 13 leading from the main or auxiliary air-conditioner unit 12 is arranged to extend in part along rear portions of the side roof rails 9 and in part along the rear roof bow 10 as shown.

Accommodation of the air-conditioner unit 12 in the luggage compartment 5 not only results in reduction of the space available therein but adds to the costs and labor for the provision of the pipings and the associated harnesses forming part of the refrigerant circuits interconnecting the air-conditioner unit 12 and the refrigerant compressor which is mounted in the engine compartment 11 for being driven by the engine. In order, furthermore, that the conditioning air supplied from the air-conditioner unit 12 be enabled to be distributed uniformly throughout the interior of the vehicle, it is important that the conditioning air duct 13 be arranged to extend over long distances along the side roof rails 9 and any other structural members and portions of the vehicle body 1. In this instance, the subtly and intricately curved configurations of the side roof rails 9 and such members and portions of the vehicle body 1 require the duct 13 to have an accordingly intricate shape throughout the extended length thereof and thus impairs or even destroys the interchangeability of the duct with ducts for other types motor vehicles. This will again give rise to an increase in the cost for installation of the air-conditioning system.

The present invention contemplates elimination of these drawbacks of motor vehicles equipped with conventional air-conditioning systems of the described general nature.

DESCRIPTION OF THE PREFERRED EMBODIMENT

Figure 2:
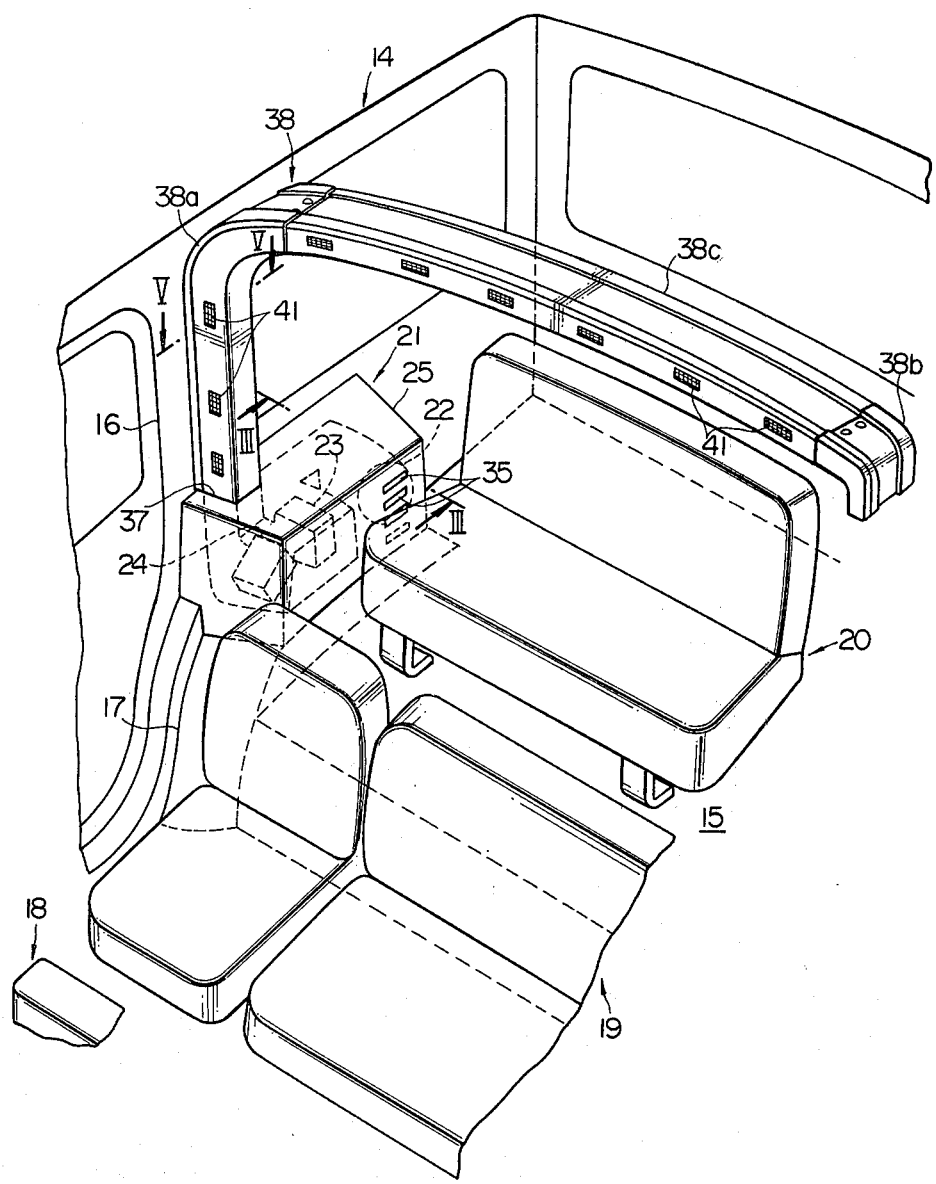
FIG. 2 is a fragmentary perspective view showing an air-conditioning system embodying the present invention as incorporated into a motor vehicle of the station-wagon type.

Referring to FIG. 2 of the drawings, a motor vehicle having incorporated therein an air-conditioning system embodying the present invention is also assumed to be of the station-wagon type having a vehicle body 14 including a floor panel 15, a pair of side wall structures each including a vertically extending center pillar 16, and a pair of rear wheel housings 17 respectively overlying the rear road wheels (not shown) and arcuately protruding upwardly into the interior of the vehicle body 14 although only one of the wheel housings is herein shown. The vehicle body 14 has installed therein a plurality of rows of seats arranged in a fore-and-aft direction of the vehicle and mounted on the floor panel 15. In the motor vehicle equipped with the air-conditioning system embodying the present invention, the rows of seats are assumed to include three rows of seats which consist of a front row of seats 18, an intermediate row of seats 19 and a rear row of seats 20. The rear row of seats 20 is assumed, by way of example, as being constituted by a single bench-type seat structure which is elongated in a lateral direction of the vehicle body 14.

Figure 3:
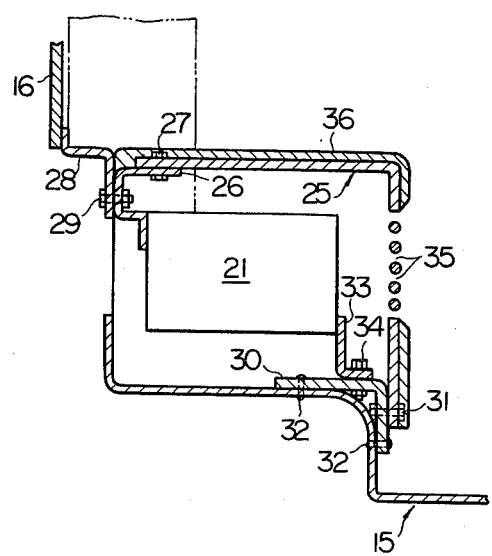
FIG. 3 is a sectional view taken on a vertical plane indicated by lines III—III in FIG. 2.

The air-conditioning system incorporated in the motor vehicle thus arranged comprises an air-conditioner assembly 21 which includes a blower unit 22 and at least one heat exchanger unit. In the embodiment herein shown, the air-conditioner assembly 21 is assumed to include, in addition to the blower unit 22, a cooling unit 23 and a heating unit 24. The blower unit 22, cooling unit 23 and the heating unit 24 are positioned sidewise of the rear seat structure 20 and preferably above one of the wheel housings 17, as shown, and are enclosed within a covering member 25 fixedly attached to the vehicle body 14. As will be better seen from FIG. 3 of the drawings, the covering member 25 has a horizontal upper panel portion spaced apart upwardly from an upper surface portion of the floor panel 15 and securely connected at the laterally outer end thereof to the inner face of a suitable side wall member such as the center pillar 16 by a bracket member 26 secured to the covering member 25 of the vehicle body by bolts and nuts 27 and a bracket member 28 secured to the bracket member 26 by bolts and nuts 29 and to the center pillar 16 by suitable fastening or connecting means. The covering member 25 further has a side panel portion downwardly bent from the horizontal upper panel portion and securely connected at the lower end thereof to the floor panel 15 by a bracket member 30 secured to the side panel portion by bolts and nuts 31 and to the floor panel 15 by screws 32. Thus, the floor panel 15, center pillar 16 and covering member 25 have formed therebetween a space in which the blower unit 22, cooling unit 23 and heating unit 24, constituting the air-conditioner assembly 21, are supported by the bracket member 26 and a bracket member 33 secured to the bracket member 30 by bolts and nuts 34. The elements and members thus connecting the covering member 25 to the floor panel 15 and the center pillar 16 as above described are merely by way of example and may be constituted by any other forms of fastening and connecting means. The side panel portion of the covering member 25 has formed therein a plurality of openings such as parallel slots 35 which are located in the neighborhood of the blower unit 22 so as to enable the blower unit 22 to suck in air from the interior of the vehicle body 14. The covering member 25 thus arranged on one side of the rear seat structure 20 serves not only to cover the air-conditioner assembly 21 but as an armrest for an occupant of the seat structure 20. Preferably, the covering member 25 is covered with a pad 36 (FIG. 3) having an outer surface colored similarly to the external surfaces of the rows of seats 18, 19 and 20. The horizontal upper panel portion of the covering member 25 is formed with an opening 37 (FIG. 2).

The air-conditioning system embodying the present invention further comprises a duct structure 38 through which the ar conditioned supplied from the air-conditioner assembly 21 is to be distributed into the interior of the vehicle. As illustrated in part in FIG. 2, the duct structure 38 comprises at least three tubular segments consisting of a pair of side segments 38a and 38b and one intermediate segment 38c. The two side segments 38a and 38b extend vertically on the inner surfaces of suitable opposite side wall members, respectively, such as the center pillars 16 of the vehicle body 14. One of the side segments such as the side segment 38a as shown extends in part upwardly from the above described covering member 25 and in part downwardly below the horizontal upper wall portion of the covering member 25 through the above mentioned opening 37 in the upper portion of the covering member 25. The two side segments 38a and 38b have upper end portions located immediately underneath the lower surface of the roof panel of the vehicle body 14 and curved toward each other, viz., inwardly in a lateral direction of the vehicle body 14 as shown in FIG. 2. The side segment 38a communicates at its lower end with the cooling and heating units 23 and 24 so that the air cooled by the cooling unit 23 on the cooling cycle of the air-conditioner assembly 21 or the air heated by the heating unit 24 on the heating cycle of the air-conditioner assembly 21 is delivered into the segment 38a. On the other hand, the intermediate segment 38c of the duct structure 38 longitudinally extends along the lower surface of the roof panel of the vehicle body 14 and is securely connected at the opposite longitudinal ends thereof to the above described side segments 38a and 38b, respectively, by spot welding or by the use of suitable fastening means such as clips or bolts. Since the duct structure 38 in the air-conditioning system embodying the present invention is thus composed of the combination of the three segments 38a, 38b and 38c, the duct structure 38 can be assembled to the vehicle body 14 with utmost ease and is applicable to the body structure of a vehicle of another type, model or make simply by changing the intermediate segment 38c with a segment tailored to the different type, model or make.

Figure 4:
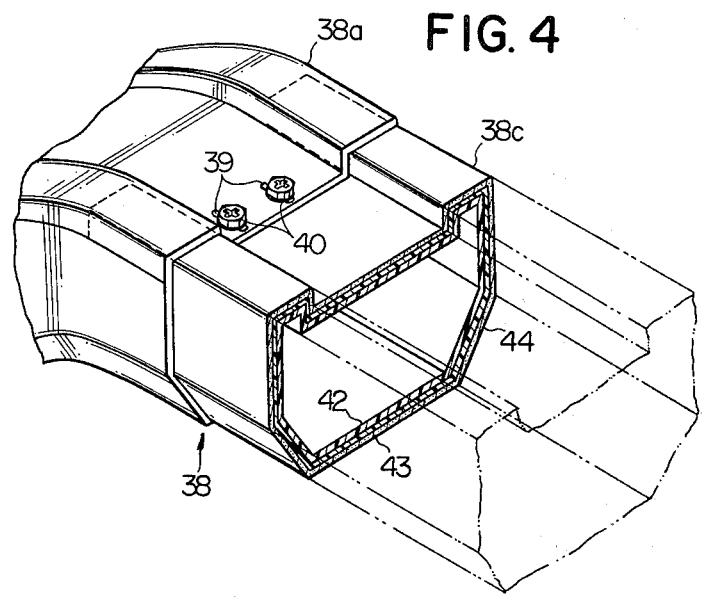
FIG. 4 is a partially cut-away perspective view showing portions of the duct structure 38 forming part of the air-conditioning system embodying the present invention as shown in FIG. 2.

In the embodiment herein shown, each of the side segments 38a and 38b has an upper end portion snugly receiving on its inner surfaces a longitudinal end portion of the intermediate segment 38c and has formed in the upper end portion a suitable number of slots 39 which are elongated in lateral directions of the vehicle body 14 as will be seen from the illustration of FIG. 4 of the drawings. The above mentioned fastening means thus comprises bolts 40 fastening together the respective overlapped portions of the side and intermediate segments 38a and 38c through the slots 39 and the holes (not shown) formed in the end portion of the intermediate segment 38c. The elongated slots 39 thus formed in each of the side segments 38a and 38b serve not only to facilitate assembling of the segments 38a, 38b and 38c together but to take up the dimensional errors and the thermal expansion and contraction of the segments 38a, 38b and 38c. The intermediate segment 38c as a whole is curved or otherwise configured conformingly to the geometry of the lower surface of the roof panel of the vehicle body 14. Each of the side and intermediate segments 38a, 38b and 38c of the duct structure 38 is formed with a plurality of air outlets 41 including those directed forwardly as shown in FIG. 2 and those directed rearwardly in the vehicle body 14.

Figure 5:
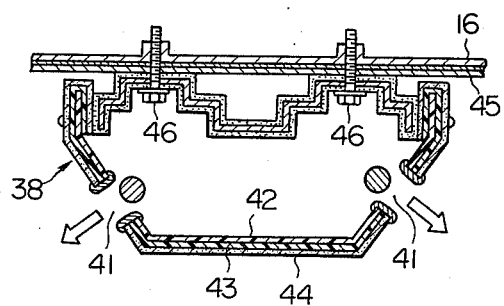
FIG. 5 is a sectional taken on a horizontal plane indicated by lines V—V in FIG. 2.

As will be better seen from FIG. 5 of the drawings, furthermore, each of the segments 38a, 38b and 38c is preferably constructed of a laminar panel structure composed of three layers which consist of an inner layer 42 of a rigid synthetic resin, an intermediate layer 43 of a suitable heat insulating material such as, for example, polyurethane bonded or otherwise securely attached to the outer surface of the inner layer 42, and an outer layer 44 of a decorative web such as, for example, a natural or synthetic leather bonded or otherwise securely attached to the outer surface of the intermediate layer 43. The intermediate layer 43 of the polyurethane thus serves as a heat insulating layer and the outer layer 44 of the natural or synthetic leather serves as a decorative lining. The duct structure 38 thus constructed is securely attached to the internal lining (partially indicated at 45 in FIG. 5) of each of the center pillars 16 and the roof panel (not shown) of the vehicle body by suitable fastening means such as bolts 46.

What is claimed is:

1. An air-conditioning system for use in a motor vehicle having a vehicle body including a floor panel, a roof panel, and a side wall member and a seat structure mounted on the floor panel and located inside and adjacent said side wall member, the air-conditioning system comprising an air-conditioner assembly which is positioned between said seat structure and said side wall member and which includes at least one heat exchanger unit and a covering member having the heat exchanger unit enclosed in a space which is defined by the covering member, said floor panel and said side wall member and which is located above the floor panel, said covering member having a substantially horizontal upper panel portion located sidewise inwardly of said side wall member and outwardly of said seat structure and above a horizontal plane flush with the upper surface of the cushion portion of said seat structure so that the covering member is operable as an armrest for an occupant of said seat structure.

2. An air-conditioning system as set forth in claim 1, further comprising a duct structure comprising a pair of tubular side segments and a tubular intermediate segment, each of said side segments extending vertically along the inner surface of said side wall member, said intermediate segment longitudinally extending between said side segments along and in proximity to the lower surface of said roof panel generally in a transverse direction of the vehicle body and having opposite longitudinal end portions respectively connected to the side segments, one of said side segments extending in part upwardly from said covering member and communicating with said heat exchanger.

3. An air-conditioning system as set forth in claim 1 or 2, in which said vehicle body further includes a pair of wheel housings aligned with each other in a lateral direction of the vehicle body, one of the wheel housings being located substantially sidewise of the seat structure, said air-conditioner assembly being positioned above said one of the wheel housings.

4. An air-conditioning system as set forth in claim 2, in which said covering member is externally coated with a pad.

5. An air-conditioning system as set forth in claim 4, in which said pad has an external surface colored substantially similarly to the external surfaces of said seat structure.

6. An air-conditioning system as set forth in claim 2, in which each of said side segments and said intermediate segment is constructed of a laminar panel structure composed of an inner layer of a rigid synthetic resin, an intermediate layer of a heat insulating material securely attached to the outer surface of the inner layer, and an outer layer of a decorative web.

7. An air-conditioning system as set forth in claim 6, in which said heat insulating material is polyurethane.

8. An air-conditioning system as set forth in claim 6, in which said decorative web is a leather.

9. An air-conditioning system for use in a motor vehicle having a vehicle body including a floor panel, a roof panel, and a side wall member and a seat structure mounted on the floor panel and located inside and adjacent said side wall member, the air-conditioning system comprising an air-conditioner assembly which is positioned between said seat structure and said side wall member and which includes at least one heat exchanger unit and a covering member having the heat exchanger unit enclosed in a space which is defined by the covering member, said floor panel and said side wall member and which is located above the floor panel, said covering member having a substantially horizontal upper panel portion located sidewise inwardly of said side wall member and outwardly of said seat structure and above a horizontal plane flush with the upper surface of the cushion portion of said seat structure so that the covering member is operable as an armrest for an occupant of said seat structure, and a duct structure comprising a pair of tubular side segments and a tubular intermediate segment, each of said side segments extending vertically along the inner surface of said side wall member, said intermediate segment longitudinally extending between said side segments along and in proximity to the lower surface of said roof panel generally in a transverse direction of the vehicle body and having opposite longitudinal end portions respectively connected to the side segments, one of said side segments extending in part upwardly from said covering member and communicating with said heat exchanger, wherein each of said side segments has an upper end portion located immediately underneath the lower surface of said roof panel and overlapped by each of said longitudinal end portions of said intermediate segments.

10. An air-conditioning system as set forth in claim 9, in which one of said intermediate segment and each of said side segments is formed with at least one slot elongated in a lateral direction of the vehicle body, the upper end portion of each of said side segments and each of the longitudinal end portions of said intermediate segment being connected together by means of at least one connecting element fastened thereto through said slot.

* * * * *